A. S. LIBBY & L. H. DOWNING.
Hose-Coupling.
No. 132,589.  Patented Oct. 29, 1872.
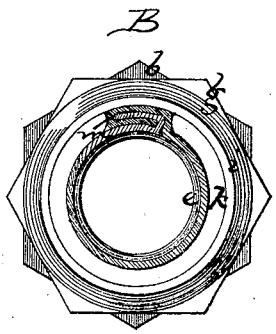
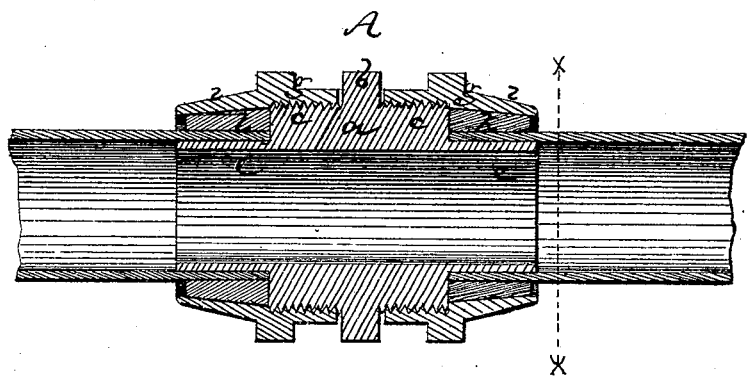

UNITED STATES PATENT OFFICE.

ASA S. LIBBY, OF LAWRENCE, AND LEVERETT H. DOWNING, OF NORTH ANDOVER, MASSACHUSETTS.

IMPROVEMENT IN HOSE-COUPLINGS.

Specification forming part of Letters Patent No. 132,589, dated October 29, 1872.

*To all whom it may concern:*

Be it known that we, ASA S. LIBBY, of Lawrence, and LEVERETT H. DOWNING, of North Andover, all in the county of Essex and State of Massachusetts, have invented an Improved Hose-Coupling; and we do hereby declare that the following, taken in connection with the drawing which accompanies and forms part of this specification, is a description of our invention sufficient to enable those skilled in the art to practice it.

The invention relates particularly to a method of coupling pieces or sections of hydraulic hose made of woven material, the edges of a strip of which are united to form a tube. The formation of such a tube leaves a shoulder at the seam; and in our invention we compress the end of the tubing between a neck or nipple piece at the end of the coupling-screw and a divided ring or a packing, the ring or packing being encompassed by a coupling-nut or screw-collar which contracts in diameter toward the outer end, so that as it is screwed upon the coupling-tube the ring or packing is forced against the tubing and compresses it upon the coupling neck or nipple, the divided ring (when a metal ring is employed) being contracted by the pressure of the screw-collar, one end edge of the ring setting against the front of the seam-shoulder. It is in this method of coupling sections of pipe that our invention consists.

The drawing represents a coupling embodying our invention. A shows an axial section of the coupling. B is a cross-section on the line $x\ x$.

$a$ denotes the main coupling-piece, composed of a wrench-head, $b$, two screws, $c\ c$, at opposite sides of this head, and nipple tubes or necks $e\ e$ at the outer ends of the screws $c\ c$. Upon the two screws $c\ c$ screw two coupling-nuts, $g\ g$, each of which has a collar, $i$. The end of the tubing lies around or encompasses the nipple-tubes $e\ e$; but between the tubing and the collar $i$ is placed a split ring, $k$, or a strip of packing, $l$, one edge of the ring or packing setting against the shoulder $m$ of the tubing, as seen at B.

The ring or the collar, or both ring and collar, may be made tapering, and as the collar screws upon the coupling-screw the ring or packing is compressed and tightened upon the tubing, and compresses the tubing between the ring and nipple so as to render the joints at the coupling impervious.

The metal ring $k$ may be employed, or a packing-ring formed of a woven strip; or loose packing may be used.

Although the coupling is very simple, it is very effective, and makes a strong union of the parts, leaving them, however, capable of easy dismemberment. The hose-tubing needs no preparation for application of the coupling.

We claim—

In combination with the coupler-screw $c$ and nipple $e$, and with the nut $g$ having the collar $i$, the packing-ring $k$ or $l$ compressed upon the tubing, and compressing the tubing between the ring or packing and the nipple $e$, substantially as shown and described.

ASA S. LIBBY.
   LEVERETT H. DOWNING.

Witnesses:
 FRANCIS GOULD,
 M. W. FROTHINGHAM.